United States Patent [19]
Esteve et al.

[11] Patent Number: 6,011,805
[45] Date of Patent: Jan. 4, 2000

[54] METHOD AND APPARATUS FOR AUTO-ADAPTING A RETRY TIMER TO AVOID DE-SYNCHRONIZATION OF COMMUNICATION PROTOCOLS

[75] Inventors: Denis Esteve, Vence; Jean-Pierre Marce, Saint-Jeannet; Pascal Thubert, Vence, all of France

[73] Assignee: International Business Machines Corporation, Armonk, N.Y.

[21] Appl. No.: 08/801,222

[22] Filed: Feb. 19, 1997

[30] Foreign Application Priority Data

Feb. 20, 1996 [EP] European Pat. Off. ............. 96480022

[51] Int. Cl.$^7$ ........................ G01R 31/08; G06F 11/00; G08C 15/00; H04L 12/28
[52] U.S. Cl. ..................... 370/468; 370/252; 370/412; 370/350
[58] Field of Search ..................... 370/231, 235, 370/236, 252, 250, 251, 400, 412, 414, 417, 418, 415, 416, 428, 429, 468, 508, 389, 350; 395/200.52, 200.06, 200.62; 340/825.14, 825.2; 375/357; 709/232, 234, 238

[56] References Cited

U.S. PATENT DOCUMENTS

| | | | |
|---|---|---|---|
| 5,042,032 | 8/1991 | Dighe et al. | 370/231 |
| 5,548,533 | 8/1996 | Gao et al. | 364/514 |
| 5,754,754 | 5/1998 | Dudley et al. | 395/182.16 |

*Primary Examiner*—Chi H. Pham
*Assistant Examiner*—Steven Nguyen
*Attorney, Agent, or Firm*—Joscelyn G. Cockburn

[57] ABSTRACT

To assure a complete transmission of frames in communication protocol such as the X25 LAPB a timer is used. The integrity of the transmission is obtained by retransmitting Iframe that are not received. Thus, each frame that is sent is controlled by a timer, called Retry Timer or T1 Timer. A short T1 Timer may cause a de-synchronization of the protocol then a connection loss. The invention aims to avoid this problem. The principle is based on the fact that the T1 Timer value is defined not only according to the speed but also to the workload of the LINK (51). The invention aims to add automatically to the initial value of the T1 Timer a queue delay. This queue delay corresponds to the delay between the enqueue of a buffer pointer (11) and the transmission of this buffer (41) on the Link. Thus, T1 Timer becomes auto-adaptive. The invention consists in performing two actions. The first action is to measure dynamically the queue delay. For this purpose, a transmit scheduler (40) sets a marker (46) in a transmit queue (30). When the transmit scheduler dequeues this marker, it updates the Queue delay in a register (60) and re-enqueues the marker. The second action is to adapt dynamically the T1 Timer. After sending a frame, if the T1 Timer expires without reception of an acknowledgment, then T1 timer is started with another value corresponding the queue delay measured above. And if the timer expires again then the LAPB (10) starts a confirmation mechanism in order to retransmit the Iframe that is not received.

10 Claims, 8 Drawing Sheets

METHOD AND APPARATUS FOR AUTO-ADAPTING A RETRY TIMER TO AVOID DE-SYNCHRONIZATION OF COMMUNICATION PROTOCOLS

FIELD OF THE INVENTION

The present invention relates to the transmission of messages in a data communication system and more particularly to a method and an apparatus for auto-adapting a Retry Timer to avoid the de-synchronization of communication protocols.

BACKGROUND ART

In most data communication systems, it is required to assure the complete and integral transmission of information frames between two systems. In the present case, both systems operate according to a certain protocol that uses timers. Therefore, each time a frame is sent, a timer is used to control the reception of an acknowledgment and if necessary, to start a confirmation mechanism in order to retransmit the information frame that is not received.

The X25 LAPB (Link Access Procedure-Balanced) operates according to the above described communication protocol. The X25 LAPB protocol enables transmission of Information Frames (called Iframes) and assures the integrity of the transmission by retransmitting Iframes that are not received. Each Iframe is controlled by a timer, called Retry Timer or T1 Timer for the X25 LAPB. If the transmitted Iframes are not acknowledged when the T1 Timer expires, then the LAPB starts the confirmation mechanism in order to re-transmit.

FIG. 1 shows the different elements which are required to transmit a frame from a first LAPB (10) to a remote LAPB which is connected through a physical line (51). The LAPB component (10) enqueues a pointer (11) of a buffer on the top of a Transmit Queue (30). The buffer which contains the Iframe to be transmitted is stored in a RAM memory (20). The Transmit Queue (30) is a chained list of pointers associated to buffers stored in RAM memory (20). The chained list is of the type FIFO (First In First Out).

A Transmit Scheduler (40) dequeues a first available pointer (31) from the Transmit Queue (30) and it reads the associated buffer (21) in RAM memory (20). Then, it provides the Iframe (41) contained in the buffer to a hardware circuit (50) which transmits the frame on the Physical Line(51) to the remote LAPB.

Once the Iframe is transmitted, the Transmit Scheduler (40) dequeues the next pointer (31) of the Transmit Queue (30). But the Iframe is released from the RAM memory (20) only when the previous frame has been acknowledged by the remote LAPB.

One of the principal problem found by the customer using X25 LAPB is the random loss of the X25 link due to a wrong appreciation of the T1 Timer value. Indeed, this value has to be defined according to the transmission speed which is inherent to type of the transmission links, and the workload of the link, the latter being tough to evaluate.

In the background art, the T1 Timer is defined once during the network configuration according to the speed of the physical line (51). T1 Timer value is always statically defined, it is never changed unless another configuration is performed. Each time, the value of T1 causes problems, it is adjusted manually in order to meet the requirement of workload of the link, which results in a waste of time due to the interruption of the link.

FIG. 2 shows the flow defined in the X25 LAPB as used in the prior art when the Iframe is not received. As is already explained above, the LAPB component (10) stores the Iframe in a buffer memory, starts the T1 timer and enqueues the Iframe in the Transmit queue. Afterwards, the Iframe is dequeued from the Transmit Queue by the Transmit Scheduler and sent to the remote LAPB by the hardware circuit (50). But the Iframe cannot be received by the remote LAPB because of an error in its integrity detected by the hardware circuit (50).

The T1 Timer expires. As no acknowledgment has been sent from the remote LAPB; the T1 timer is restarted so as to force the remote LAPB to give information of the last received Iframe by sending a Received Ready Command Polled (RRp) frame.

The remote LAPB responds with a Received Ready Response Final (RRf) frame containing the sequence Number of the Iframe that it is waiting for. The LAPB (10) restarts the T1 timer and resends the Iframe if it has not been received yet. This Iframe is in this case polled to force the remote LAPB to acknowledge its reception. The remote LAPB receives the Iframe polled and acknowledges it with a RRf frame. When the LAPB (10) receives the RRf frame, it stops the T1 timer and releases the Iframe from the memory.

FIG. 3 shows the flow in case an Iframe is kept for too long in the Transmit Queue, because of a traffic overload. Chronologically, the LAPB (10) stores the If Iframe in memory (20), starts the T1 timer and enqueues the Iframe in the Transmit queue. When an Iframe which is kept during a long time in the Transmit Queue is dequeued by the Transmit Scheduler to be sent to the remote LAPB by the hardware circuit, by the time the LAPB (10) receives the remote LAPB acknowledgement of the Iframe reception, the T1 timer has expired. Since T1 Timer has expired, the LAPB (10) starts again the T1 timer and sends a Received Ready Command Polled frame (RRp) to force the remote LAPB to give information of the last received Iframe. But, when the remote LAPB has received the Iframe it has already sent a first Received Ready Response Final frame (RRf) before the LAPB has started T1 Timer. Therefore, the LAPB (10) receives the first de-synchronized RRf, then it stops the T1 timer and releases the Iframe from the memory.

During that time, the remote LAPB receives the RRp and responds again with a Received Ready Response Final frame (RRf). When the LAPB (10) receives this second RRf and processes it as an unexpected Final Bit and it breaks the connection.

Other cases of de-synchronization due to the same reason can be found especially in the case of a Dynamic Windowing implementation. The Dynamic Windowing is rarely implemented with the LAPB protocol but is frequent with the IEEE 802.2 protocol for environments including Token Ring with bridges or Frame Relay. For more information about X25 LAPB refer to the documentation relating to the recommendations ITU_T normalization X.25 revised 1993.

SUMMARY OF INVENTION

It is an object of the invention to avoid the problem of de-synchronization due to a wrong definition of the T1 Timer value by defining it according to the transmission speed and the workload of the connection link.

It is another object of the invention to measure dynamically the queue delay which corresponds to the delay between the enqueue of a buffer pointer and the transmission of this buffer on the link so that the T1 timer becomes auto-adaptive.

The principle of the present invention is based on the fact that the T1 Timer value is not only defined according to the speed of the link but also according to a queue delay which corresponds to the workload of the transmit queue. The invention aims to add automatically the queue delay to the initial value of the T1 Timer. This queue delay corresponds to the delay between the enqueue of a buffer pointer and the transmission of this buffer on the Link. Thus, T1 Timer becomes auto-adaptive. The invention includes the performance of two actions. The first action is to measure dynamically the queue delay. For this purpose, the transmit scheduler sets a marker in the queue. When the transmit scheduler dequeues this marker, it updates the Queue delay value and re-enqueues another marker. The second action is to adapt dynamically the T1 Timer.

After sending a frame, if the T1 Timer expires without reception of an acknowledgment, then the T1 timer is restarted with another value corresponding the queue delay measured above. And if the timer expires again then the LAPB starts the confirmation mechanism in order to retransmit the Iframe.

Such a method and apparatus for auto-adapting a Retry Timer to avoid the de-synchronization of a communication protocol is clearly set below.

The present invention may also be used in all communication protocols that require timers. The following description covers the implementation of this invention on the X25 LAPB communication protocol, but it can be implemented in other communication protocols such as the IEEE 802.2.

DETAILED DESCRIPTION OF THE PRESENT INVENTION

According to the present invention, the first action is to measure the current queue delay which correspond to the delay between the enqueue of the buffer pointer in the transmit queue and the transmission of the Iframe contained in this buffer to the communication link. The delays and times are measured in tenth of seconds in our preferred embodiment in order to be comparable to the value of timer T1. Two registers are used for the implementation of the invention, a first register (60) that stores the queue delay variable and a second register (70) that stores the last time variable. Both registers are accessed by the Transmit Scheduler (40) as is shown in FIG. 4, but the first register (60) can be accessed only by the LAPB (10).

Figure 1:
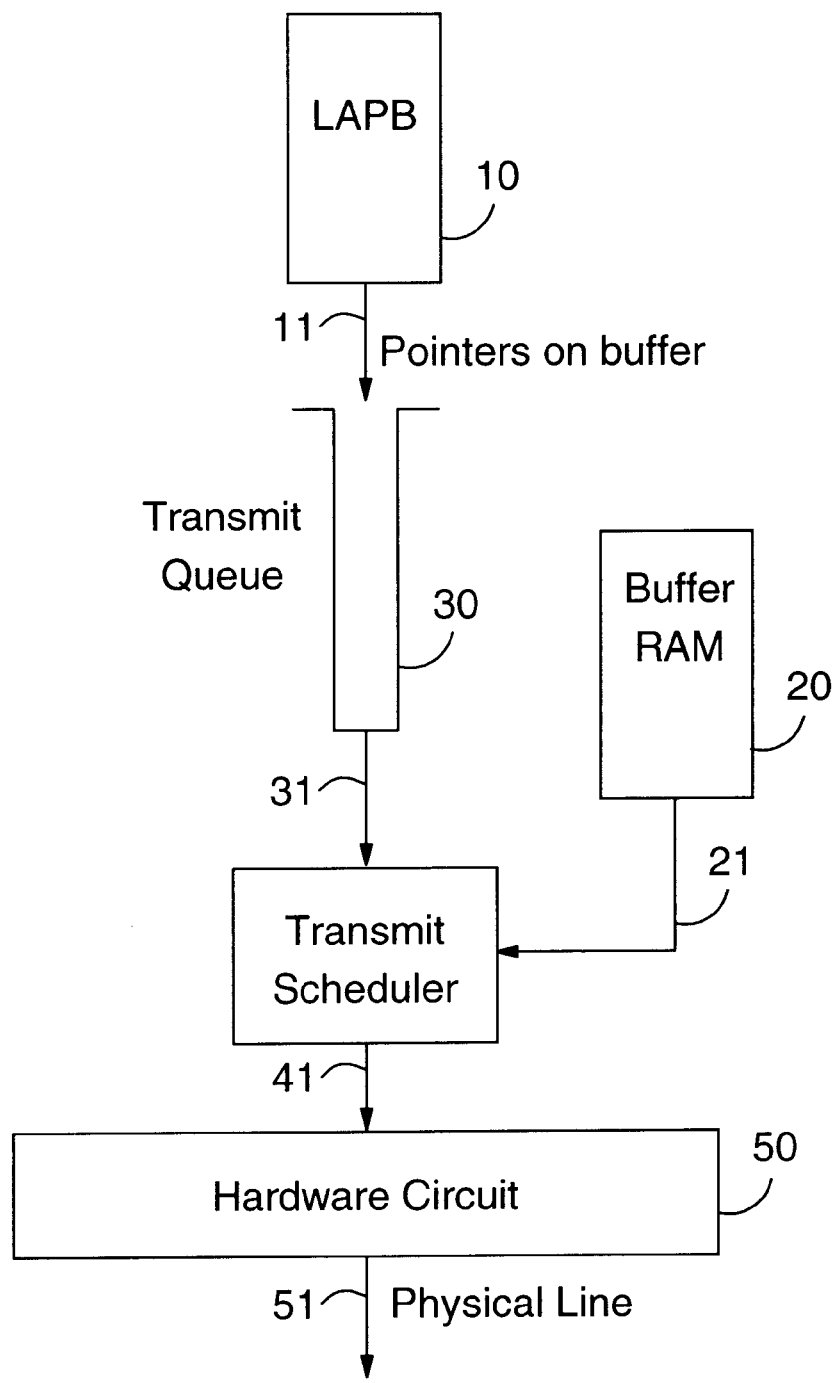
FIG. 1 describes the principle of frames transmission from the LAPB of the prior art.
Figure 2:
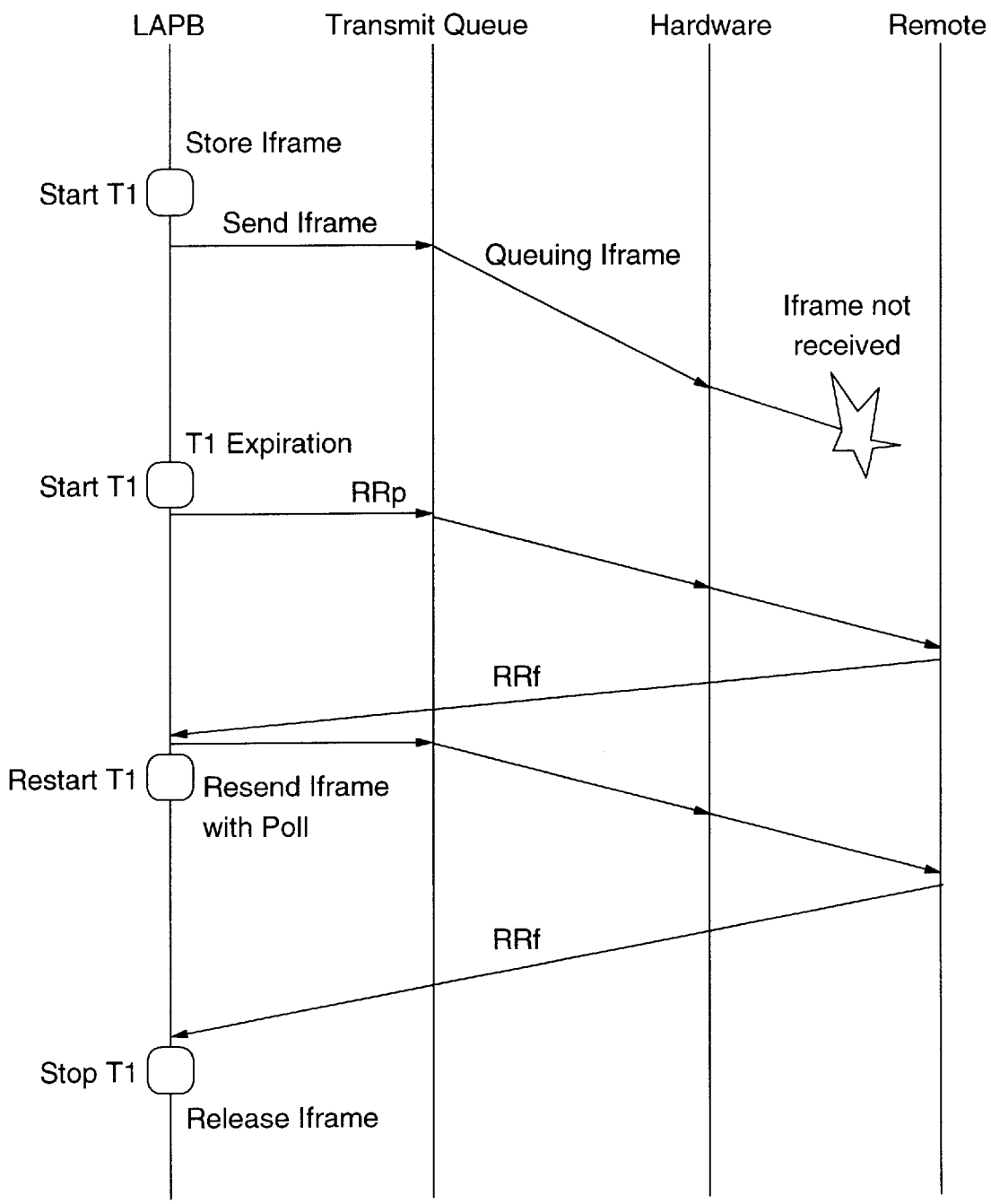
FIG. 2 describes the flow when a frame is not received from the LAPB of the prior art.
Figure 3:
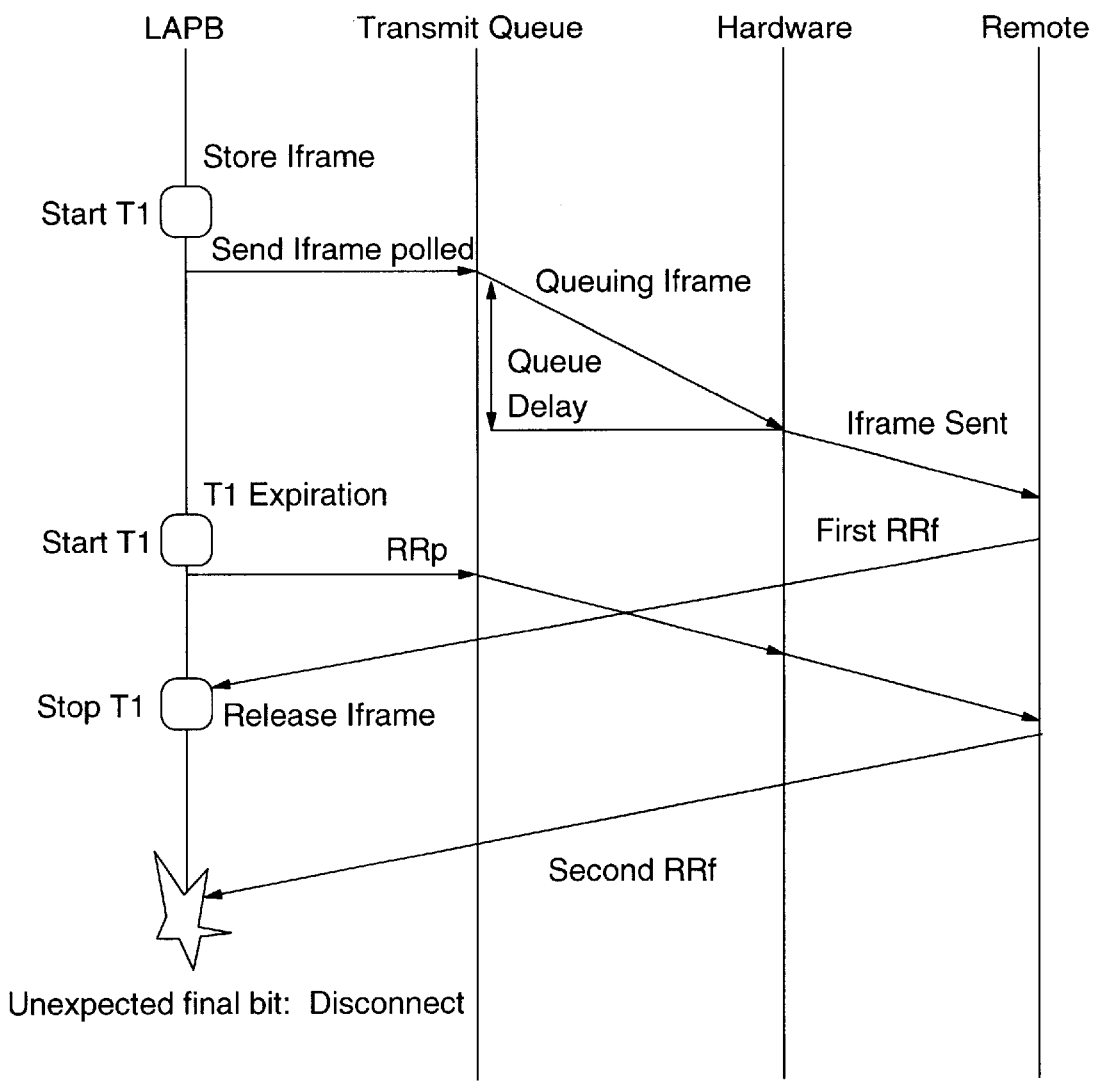
FIG. 3 describes the flow of a frame de-synchronization of the prior art.
Figure 4:
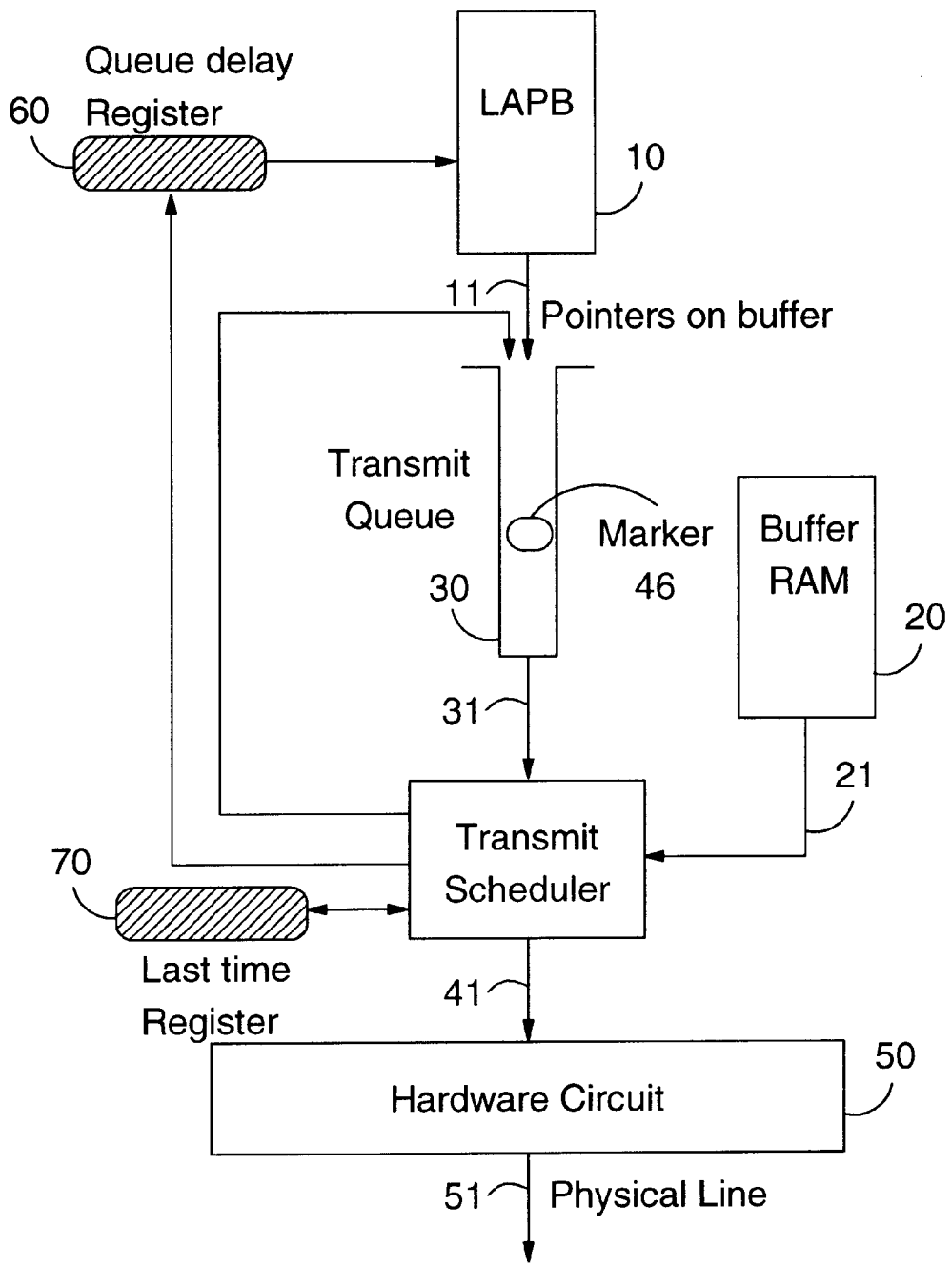
FIG. 4 describes an overview of the transmission system according to the teachings of the present invention.

FIG. 4 shows the different elements which are required to transmit a frame from a LAPB (10) to a remote LAPB (not shown in the figure).

The LAPB component (10) enqueue a pointer (11) of a buffer in a Transmit queue (30) by putting the pointer on the top of it. The buffer which contains frame to be transmitted is stored in a RAM memory (20). It should be noticed that this Transmit queue is not the same as the one in the prior art because it contains a Marker (46) which enables to measure the queue delay and its operations will be described later on. At the initialization of the transmit queue, the LAPB (10) enqueues the Marker (46) and stores the current time in the second register (70).

A Transmit Scheduler (40) dequeues a first available pointer (31) from the Transmit Queue (30) and it tests if it is a pointer of a buffer or the Marker (46). If it is a buffer pointer the Transmit Scheduler (40) reads Iframe (21) contained in the buffer and provides it to hardware circuit (50) on a link (41). This Iframe is then transmitted on the Physical Line (51) to the remote LAPB. If it is the Marker (46) which is a pointer easily detectable by the Transmit Scheduler because of its code (e.g. x'FFFF').

When the Transmit Scheduler (40) dequeues the marker (46), it updates the Queue Delay register (60) by storing the value corresponding to the difference between the current time and the value stored in register (70). Besides it stores the current time in register (70), and it enqueues once again the marker (46) as a pointer (45).

The Queue Delay (60) measured corresponds to the instantaneous delay of a Iframe or more specifically the Marker (46) between its enqueueing in the transmit queue by the LAPB (10) and its dequeueing for the transmission to the hardware circuit (50).

Figure 5:
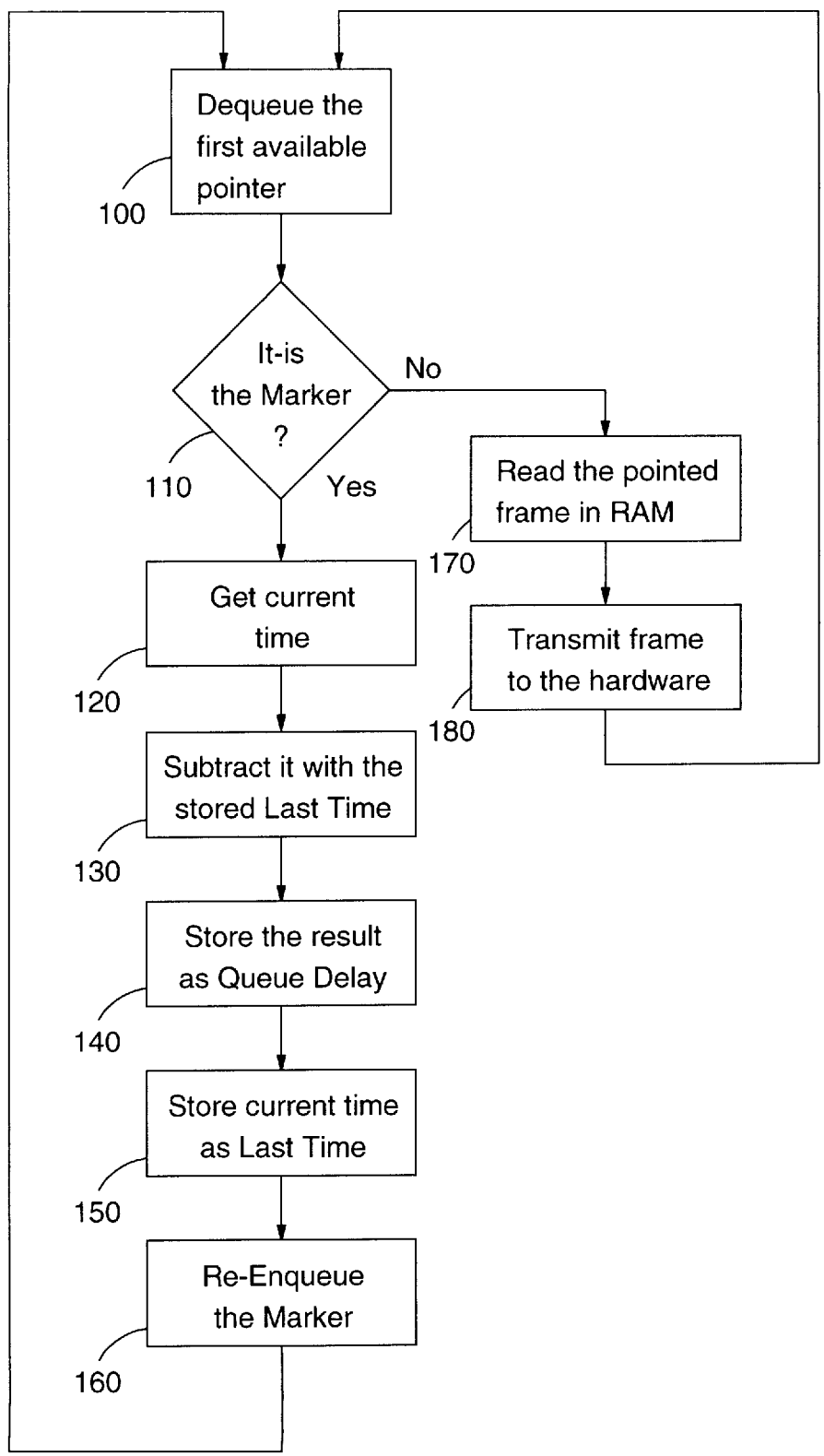
FIG. 5 is a flow chart of the operations performed by the transmit scheduler according to the present invention.

FIG. 5 is a detailed flow chart of the operations performed by the transmit scheduler (40) according to the present invention.

At step 100, the Transmit Scheduler (40) dequeues a first available pointer from the Transmit Queue (30), and it tests at step 110 whether the pointer dequeued is the Marker (46) or not.

If it is the Marker, at step 120, The Transmit Scheduler gets the current time and it subtracts the current time from the Last Time previously stored in register (70), at step 130. Then it stores, at step 140, the result in the Queue Delay register (60) which will be read by the LAPB (10) (refer to FIG. 6 description). Besides at step 150, it stores the current time in the Last Time register (70).

If it is not the Marker, at step 170 the Transmit Scheduler reads the buffer that contains the Frame to which the pointer is pointing and it provides at step 180, the frame to the hardware in order to transmit it to the remote LAPB on the Physical Line (51).

Afterwards, it loops back to step 100 where the Transmit Scheduler dequeues the next pointer from the Transmit Queue and performs the same operations as previously described.

The second action is to adapt dynamically the T1 Timer. Each Iframe sent by LAPB is controlled by a T1 timer.

Figure 6:
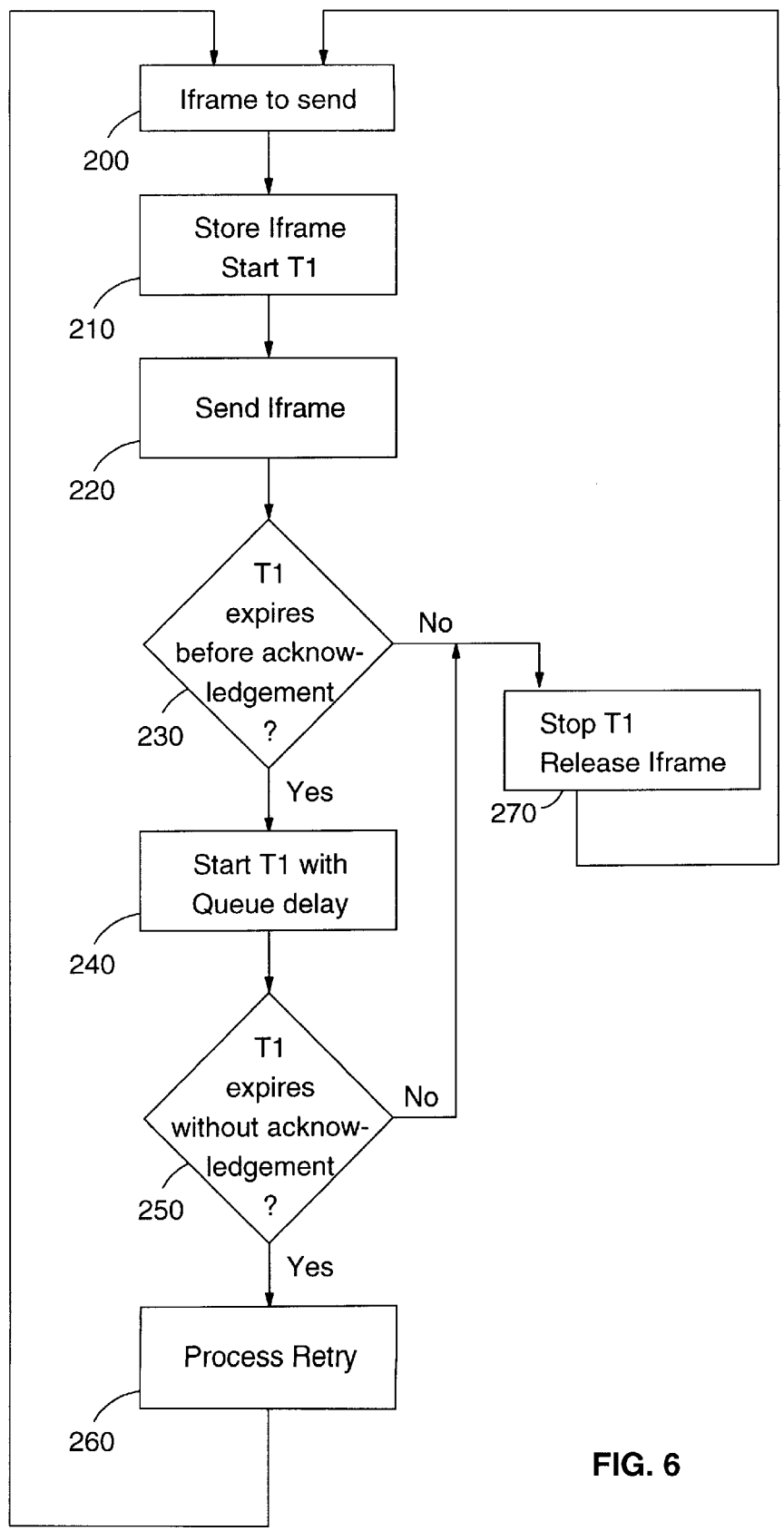
FIG. 6 is a flow chart of the operations performed by the LAPB transmitting an Iframe.

FIG. 6 is a detailed description of the operation performed by the LAPB (10) according to the present invention.

At step 200, the LAPB (10) has an Iframe to transmit to the remote LAPB. At step 210, the LAPB (10) stores the Iframe in RAM Memory and starts the T1 timer with the T1 value defined at the configuration time. Then, it enqueues the Iframe in the Transmit Queue at step 220. Afterwards, at step 230, it tests if T1 timer has expired before the reception of the Iframe acknowledgment from the remote LAPB.

In case the acknowledgment is received before the expiration of T1 timer, at step 270, the LAPB (10) stops the T1 timer, releases the Iframe from the memory (20) and loops back to step 200, waiting for a new Iframe to send.

In case T1 Timer expires without having received the Iframe acknowledgment from the remote LAPB, at step 240, the LAPB (10) starts the T1 timer not with the initial value but with the current Queue delay value stored in register (60), this Queue delay being updated by the Transmit Scheduler as is previously described in FIG. 5. Then at step 250, it is tested whether the queue delay expires again without having received the Iframe acknowledgment from the remote LAPB.

In case the acknowledgment is received before the expiration of the queue delay, at step 270, the LAPB (10) stops the T1 timer, releases the Iframe from the memory (20) and loops back to step 200, waiting for a new Iframe to send.

In case the queue delay expires without having received the Iframe acknowledgment from the remote LAPB, at step 260, the Iframe is considered as not received, then the LAPB (10) starts a confirmation mechanism in order to retransmit the Iframe that is not received. This mechanism is defined in the X.25 LAPB normalization. The LAPB (10) loops back to step 200, waiting for a new Iframe to send.

Figure 7:
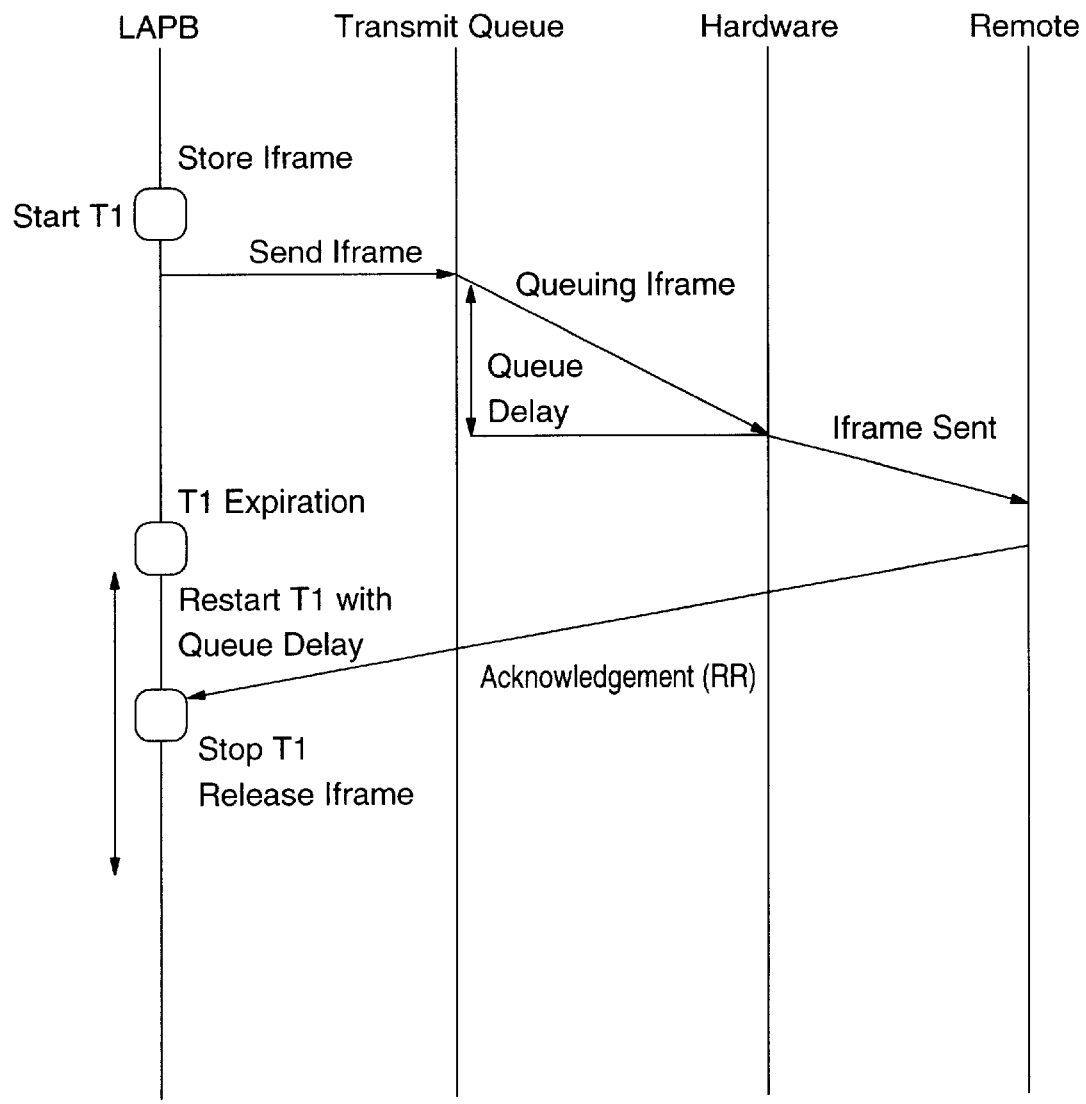
FIG. 7 describes the de-synchronization problem solved by the present invention.

FIG. 7 shows the case of de-synchronization that can be avoided according to the present invention, especially when an Iframe is kept during too long a period in the Transmit Queue because of a traffic overload.

The LAPB (10) stores the Iframe in memory (20), starts the T1 timer and enqueues the Iframe pointer in the Transmit queue (30). Since the Iframe remains during a long period in the Transmit Queue, when it is dequeued by the Transmit Scheduler and received by the remote LAPB, the T1 timer has expired before the reception of the remote acknowledgment.

According to the present invention, once the T1 Timer has expired, the LAPB (10) starts again the T1 timer but with the measured Queue Delay. And when it receives the Iframe acknowledgement RRf (Received Ready Response Final) sent by the remote LAPB at the reception of the Iframe, it stops the T1 timer and releases the Iframe from the memory. Therefore, the desychronization of the LAPB (10) is avoided. The implementation of the invention has no impact on the normalized X.25 LAPB protocol in case the Iframe is not received by the remote LAPB.

Figure 8:
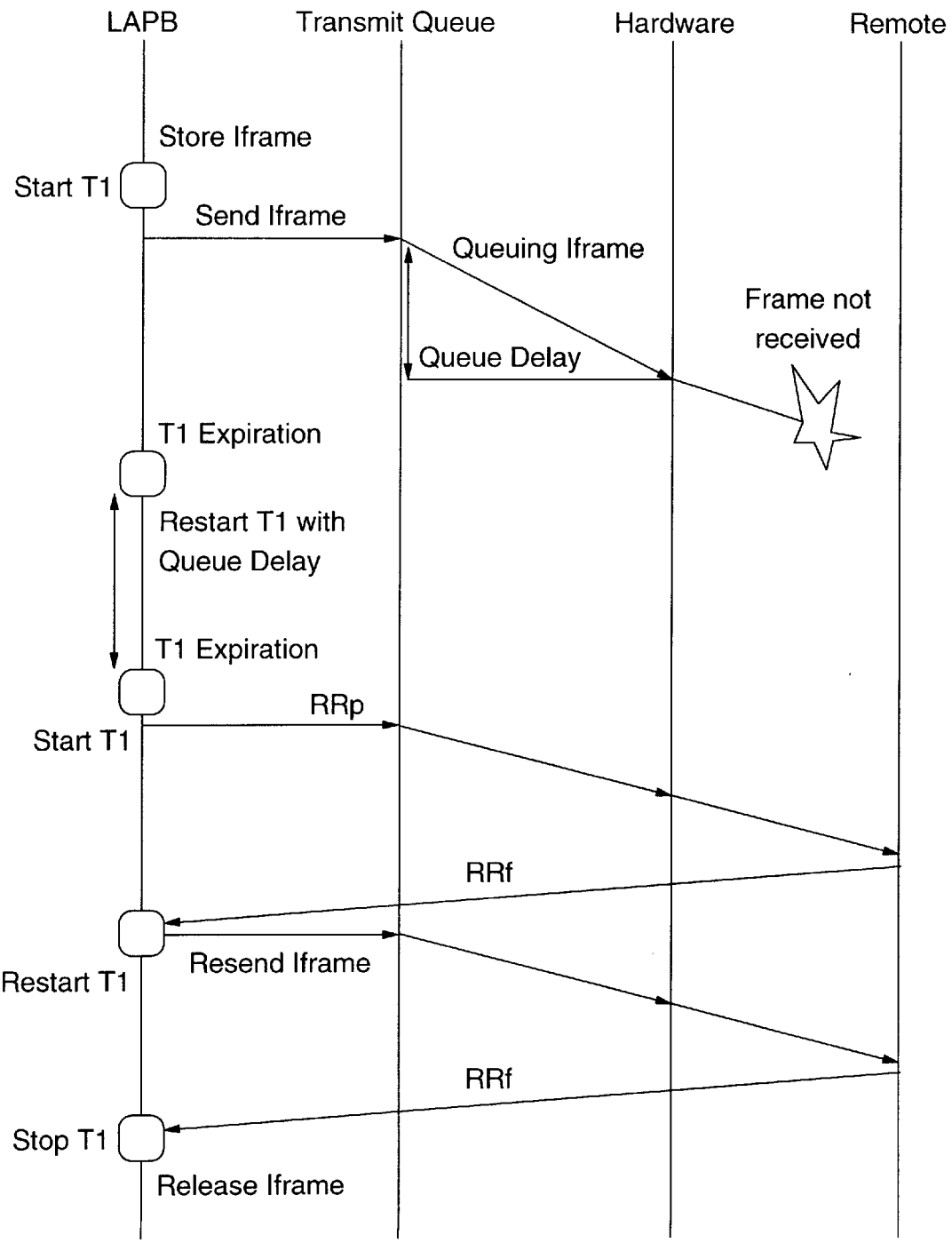
FIG. 8 describes the case when an Iframe is not received according to the present invention.

FIG. 8 shows a case where an Iframe is not received by the remote LAPB according to the present invention.

The LAPB (10) stores the Iframe in memory (20), starts the T1 timer and enqueues the Iframe in the Transmit queue (30). In the same way, the Iframe remains during a long period in the Transmit Queue. Moreover, the Iframe cannot be received by the remote LAPB because of the bad integrity the received bytes of the Iframes.

According to the present invention, at the expiration of the T1 timer, the LAPB (10) starts it again with the measured Queue Delay. If this queue delay expires again and since no acknowledgment has been received from the remote LAPB, the LAPB (10) starts again the T1 timer with the initial value and by sending a Received Ready Command Polled (RRp) frame it forces the remote LAPB to respond by a RRf frame in order to inform of the last received Iframe.

The Received Ready Response Final frame (RRf) contains the sequence Number of the Iframe that it is waiting for. Then, the LAPB (10) restarts the T1 timer and resends the Iframe which is in this case polled to forced the remote LAPB to acknowledge at its reception.

When the remote receives the Iframe it acknowledges it with a RRf and the LAPB (10) stops the T1 timer and releases the Iframe from the memory.

The combination of the current queue delay and a short initial T1 timer value optimizes without any risk the response time in the case of links with many retransmission frames such as the low speed link X25, the Token Ring with charged bridges or the Frame relay with many intermediary nodes.

We claim:

1. A method of auto-adapting a retry timer to avoid transmission desynchronization between a first and second communication protocols implemented in a data communication system comprising a memory (20) which stores buffers containing data frames to be transmitted to said second communication protocol, a transmit queue (30) storing a chained list of buffer pointers (11) including locations of said buffers, a transmit scheduler (40) dequeueing first available pointers (31) from said transmit queue (30) to transmit data frames to the second protocol; said method comprising the steps of:

(a) inserting a marker in the transmit queue;

(b) dequeueing (100) a first available pointer (31) from the transmit queue (30);

(c) testing if said available pointer (31) is a marker (46) or a buffer pointer (21);

(d) if it is the buffer pointer (21), transmitting (170,180) data frame corresponding to said buffer pointer to said second communication protocol and processing the next available pointer (31);

(e) otherwise, computing (130) the queue delay by subtracting the current time from the time when the marker was enqueued;

(f) storing (140,150) said queue delay in a first register (60) and said current time in a second register (70) for the next computation of the queue delay; and (g) re-enqueueing (160) said marker (46) and processing the next available pointer (31).

2. The method of claim 1 further including the steps of:

storing (210) data frame in the memory (20) and starting a timer T1 with its initial value;

enqueueing (220) a pointer associated to said data frame in the transmit queue (30);

testing (230) if said timer T1 has expired before the reception of said data frame acknowledgement sent from said second communication protocol;

if the acknowledgement is received before the expiration of timer T1, stopping (270) said timer T1, releasing said data frame from the memory and processing next data frame;

if said timer T1 has expired without receiving the data frame acknowledgement, starting (240) timer T1 with a value of the queue delay stored in said first register (60);

if once again said queue delay has expired without receiving the data frame acknowledgement, processing (260) a retry process; and if an acknowledgement is received before the expiration of said queue delay, stopping (270) said timer T1, releasing said data frame from the memory and processing next data frame.

3. The method according to claim 1 or claim 2 wherein both communication protocols are of the type (LAPB) X25 Link Access Procedure-Balanced.

4. An apparatus for auto-adapting a retry timer to avoid transmission desynchronization between a first and second communication protocols implemented in a data communication system comprising a memory (20) which stores buffers containing data frames to be transmitted to said second communication protocol, a transmit queue (30) storing a chained list of pointers (11) of said buffers, a transmit scheduler (40) dequeuing first available pointers (31) from said transmit queue (30) to transmit data frames to the second communication protocol, said apparatus including:

- a marker (46) disposed in the transmit queue for measuring a queue delay of said transmit queue;
- a first register in which said queue delay is being stored;
- transmit scheduler for dequeuing (100) a first available pointer (31) and for testing if said available pointer (31) is a marker (46) or a buffer pointer (21);
- means transmitting (170,180) data frame corresponding to said buffer pointer to said second communication protocol and processing the next available pointer (31);
- means for computing (130) the queue delay by subtracting the current time from the time when the marker was enqueued;
- means for storing (140,150) said queue delay in said first register (60) and said current time in a second register (70) for the next computation of the queue delay; and
- means for re-enqueueing (160) said marker (46) and processing the next available pointer (31).

5. The apparatus of claim 4 further including:
- means for storing (210) data frame in the memory (20) and starting a timer T1 with its initial value;
- means for enqueueing (220) a pointer associated to said data frame in the transmit queue (30);
- means for testing (230) if said timer T1 has expired before the reception of said data frame acknowledgement sent from said second communication protocol;
- means for stopping (270) said timer T1, releasing said data frame from the memory and processing next data frame if the acknowledgement is received before the expiration of timer T1;
- means for starting (240) timer T1 with a value of the queue delay stored in said first register (60) if said timer T1 has expired without receiving the data frame acknowledgement;
- means for processing (260) a retry process if once again said queue delay has expired without receiving the data frame acknowledgement; and
- means for stopping (270) said timer T1, releasing said data frame from the memory and processing next data frame if an acknowledgement is received before the expiration of said queue delay.

6. The apparatus according to claim 4 wherein both communication protocols are of the type LAPB X25.

7. A method for transferring data between a first entity and a second entity in data communications systems including the steps of:
- storing data frame in a memory and starting a timer T1 set to an initial value;
- enqueueing, in a queue, a pointer associated with said data frame;
- testing if said timer T1 has expired before the reception of a data frame acknowledgement sent from said second entity;
- if the acknowledgement is received before the expiration of timer T1, stopping said timer T1, releasing said data frame from the memory and processing next data frame;
- if said timer T1 has expired without receiving the data frame acknowledgement, starting timer T1 with a value representing a queue delay;
- if once again said queue delay has expired without receiving the data frame acknowledgement, processing a retry process; and
- if an acknowledgement is received before the expiration of said queue delay, stopping said timer T1, releasing said data frame from the memory and processing next data frame.

8. The method according to claim 7 wherein communication protocols used in the first entity and the second entity are of the type Link Access Procedure-Balanced (LAPB) X25.

9. A method for transferring data between a first entity and a second entity in a data communications network including the steps of:
- storing at least one data frame in a memory;
- starting a timer set to an initial value;
- enqueuing, in a queue, at least one pointer associated with said at least one data frame;
- dequeuing said pointer;
- transferring the data frame identified by said pointer;
- determining if said timer has been expired before reception of a data frame acknowledgement sent from said second entity; and
- restarting said timer set to a value representing a queue delay only if the timer expired prior to receiving the data frame acknowledgement.

10. The method of claim 9 wherein the communications protocols used in the first entity and the second entity are of the type Link Access Procedure-Balanced (LAPB) x25.

* * * * *